P. W. FLEISCHER.
WASHER.
APPLICATION FILED JULY 21, 1921.

1,424,008.

Patented July 25, 1922.

INVENTOR.
Paul W. Fleischer
BY
Lotka, Kehlenbeck & Mathé
ATTORNEYS.

UNITED STATES PATENT OFFICE.

PAUL W. FLEISCHER, OF WEEHAWKEN, NEW JERSEY.

WASHER.

1,424,008.  Specification of Letters Patent.  Patented July 25, 1922.

Application filed July 21, 1921. Serial No. 486,379.

*To all whom it may concern:*

Be it known that I, PAUL W. FLEISCHER, a citizen of the United States, and resident of Weehawken, in the county of Hudson and State of New Jersey, have invented certain new and useful Improvements in Washers, of which the following is a specification.

My present invention relates to washers employed for securing or confining parts of machinery and of other structures, and is particularly intended for use in connection with loose or rotary parts and with so-called split pins or cotter pins. The improved washer disclosed herein is very strong and durable, and so constructed as to avoid wearing off the split pins or the like, and provision is made for a simple adjustment to regulate clearance or take up wear.

Without desiring to restrict myself to the specific details illustrated, I will now proceed to describe a satisfactory and preferred embodiment of my invention, with reference to the accompanying drawings, in which—

Figure 1:
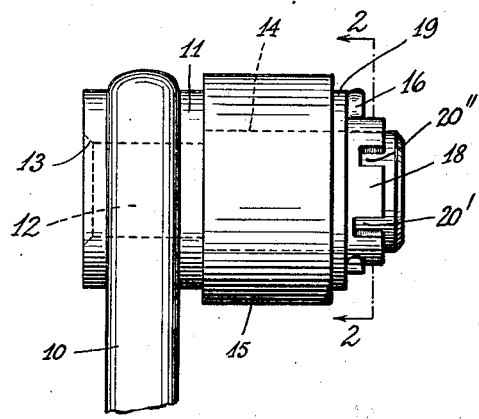
Figure 2:
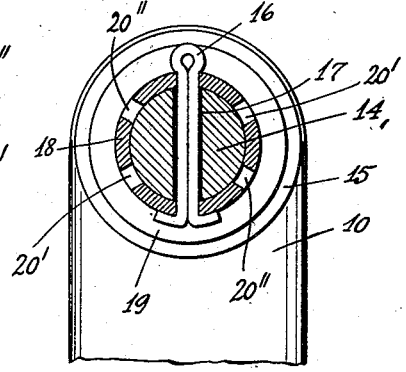
Figure 3:
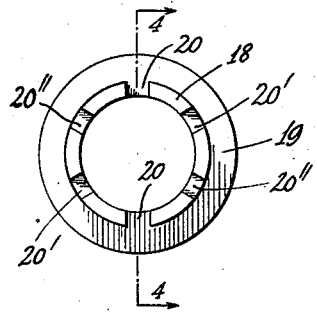
Figure 4:
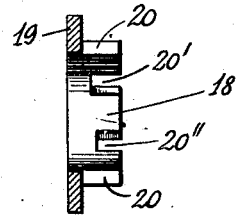

Fig. 1 is a side elevation of a lever and roller with my improved washer applied thereto; Fig. 2 is a cross section on line 2—2 of Fig. 1; Fig. 3 is an end view of the washer; and Fig. 4 is a cross section on line 4—4 of Fig. 3.

The drawings show my improved washer applied to a lever and roller of the type customarily employed in connection with cams. The lever 10 is provided at its end with a boss 11 perforated to receive the smaller end 12 of a pin or stud suitably secured therein for instance by riveting the end of said pin, as indicated at 13. The larger end 14 of the pin or stud forms a bearing for the roller 15 and is also adapted to receive the improved washer, as well as the cotter pin or other securing means 16 extending through a diametral aperture 17 of the stud portion 14 and holding the said washer against rotation as will be described below.

The improved washer consists of two portions preferably integral with each other and this washer may be made conveniently from sheet-metal, for instance by stamping. The tubular or neck portion 18 of the washer is provided with diametrically opposite notches to receive the cotter pin or other fastener 16, while the outwardly extending annular flange 19 of the washer is located adjacent to the roller 15 or other part to be confined. The open ends of the notches are away from the flange 19 and from the roller 15. I have found it desirable to employ a plurality of pairs of such notches or apertures, different pairs having their bottom walls (that is, the walls nearest the flange 19) at different distances from the flanged end of the washer. In the drawings I have shown a washer having three pairs of notches 20, 20′ and 20″ respectively, one of said pairs, 20, having its bottom walls flush with the flange 19 while the other two, 20′ and 20″, have their bottom walls nearer the free end of the neck portion 18, and at different distances from the flange 19, the bottom walls of the notches 20″ being shown twice as far from the flange 19 as the bottom walls of the notches 20′. The bottom walls of apertures of the same pair are in the same transverse plane.

It will be understood that the flange 19 of the washer is interposed between the cotter pin or other fastener 16 and the roller or other movable part 15, and that the washer is held against rotation by the said pin or fastener. I thus avoid all danger of the fastener being sheared off or worn through from the side, either by the roller 15 or like part, or by the washer itself, which danger is strongly present when employing the usual style of loose or rotary washer. It will be further understood that by removing the fastener 16 from one set of notches, say 20, then turning the washer until another set of notches registers with the aperture 17 of the stud portion 14, and re-inserting the fastener in such aperture, I may effect an adjustment of the washer lengthwise of the stud 12, 14, to compensate for any wear of the roller 15, or to vary the clearance or play given to such roller lengthwise of the stud portion 14.

While I have shown my improved washer in connection with a lever carrying a roller to engage a cam or the like, it will be obvious that my invention may be used in many other relations, for instance for roller-carrying studs of any description, studs on which idler gears or idler pulleys are mounted, and also parts which do not rotate, but have a rocking or other motion, such as the ends of connecting rods, etc.

Various modifications may be made without departing from the nature of my invention as set forth in the appended claim.

I claim:

A washer comprising a tubular or neck portion and a flange extending outwardly at one end of said neck portion, the said neck portion being provided with a plurality of pairs of notches, open at the end of said portion opposite to the flanged end, and having their bottom walls at different distances from said flanged end.

In testimony whereof, I have signed this specification.

PAUL W. FLEISCHER.